United States Patent
Gregor et al.

(12)

(10) Patent No.: US 6,317,957 B1
(45) Date of Patent: *Nov. 20, 2001

(54) METHOD FOR FABRICATING AN EXCAVATOR BASE

(75) Inventors: Robert A. Gregor, New Berlin; David S. Austin, Oak Creek, both of WI (US)

(73) Assignee: Bucyrus International, Inc., South Milwaukee, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/181,452

(22) Filed: Oct. 29, 1998

Related U.S. Application Data

(60) Provisional application No. 60/081,664, filed on Apr. 14, 1998.

(51) Int. Cl.[7] .................................................... B21D 39/03
(52) U.S. Cl. ............................................. 29/429; 29/897.3
(58) Field of Search .................................. 29/429, 897.3, 29/464; 172/1; 52/247, 79.5, 745.15, 745.16, 745.19, 745.2

(56) References Cited

U.S. PATENT DOCUMENTS

| | | | |
|---|---|---|---|
| 1,939,732 | * 12/1933 | Stresau | 29/897.3 |
| 2,404,857 | * 7/1946 | McLaren | 29/466 |
| 3,064,770 | * 11/1962 | Andrews | 29/897.3 |
| 3,073,573 | * 1/1963 | Haskins | 29/429 |
| 3,237,295 | * 3/1966 | Konzak | 29/429 |
| 3,239,927 | * 3/1966 | Hazak | 29/429 |
| 3,241,701 | * 3/1966 | Boggs | 29/429 |
| 3,380,147 | * 4/1968 | McDonald | 29/429 |
| 3,546,831 | * 12/1970 | Romo et al. | 29/429 |
| 3,956,816 | * 5/1976 | Short | 29/429 |
| 4,067,097 | * 1/1978 | Okamoto | 29/429 |
| 4,121,747 | * 10/1978 | McFatter | 29/429 |
| 4,142,284 | * 3/1979 | Steuber | 29/429 |
| 4,651,401 | * 3/1987 | Arbella | 29/429 |

* cited by examiner

*Primary Examiner*—S. Thomas Hughes
*Assistant Examiner*—T. Nguyen
(74) *Attorney, Agent, or Firm*—Quarles & Brady LLP

(57) ABSTRACT

An excavator base is fabricated on-site by first erecting a substructure of beams on a concrete foundation. Large flat plates are placed on the substructure, welded together at their adjacent edges, and cut at a perimeter to form a bottom plate. A prefabricated center section is welded to the bottom plate. Upright diaphragms and edge plates are assembled on the bottom plate and welded to each other and to the bottom plate. Large flat plates are assembled on the top of the diaphragms, and edge plates, and are welded thereto and to each other. The welded plates are cut at a perimeter to complete a top plate. The base is then removed from the substructure. Alternately, the top plate can be formed on the substructure first and then removed and set aside for later use. Adjacent plates are held flat for welding using brackets and wedges.

9 Claims, 7 Drawing Sheets

METHOD FOR FABRICATING AN EXCAVATOR BASE

This application claims the benefit of U.S. Provisional Application No. 60/081,664, filed Apr. 14, 1998.

BACKGROUND OF THE INVENTION

This invention relates to large earth excavators, and more particularly to a method of fabricating the base of an excavator at the site at which the excavator is to be used.

Certain excavators have large circular bases that support a rotating mechanism for an upper works and the drive mechanisms for rotating the upper works. Such bases have been built in diameters up to 105 feet. Such bases can have internal diaphragms located in a circumferential, radial, rectangular, or triangular pattern, or combinations thereof. Excavator bases have been constructed in factories. Because of their size, the bases must be built in segments or sections. Sometimes these segments or sections are assembled in the factory to check for fit, disassembled, and then the segments or sections are shipped piece by piece to the job site at which the base will be assembled. The base segments or sections are then reassembled and welded together, machined as required, and then assembled to the excavator.

FIGS. 1, 2, and 3 of the drawings illustrate one example of an excavator base designed for fabrication in a factory. This excavator base is characterized by being formed from a series of outer segments A (FIG. 1), inner segments B (FIGS. 1 and 3), central segments C (FIG. 1), and a base center D (FIG. 1). Each of the elements A, B, C and D are separately built and assembled together in the factory. The elements are subsequently disassembled and placed on flat bed trailers or railroad cars for transportation to the site. The size of such trailers or railroad cars dictate the maximum size of the individual elements. The maximum size of the individual elements also dictates the design of the interior diaphragms. When segments are used as in FIGS. 1–3, radial diaphragms and tangential diaphragms of many sizes and shapes are dictated.

This invention provides a method for the on-site fabrication of an excavator base allowing for optimization of design without concern for shipping constraints of large sections.

SUMMARY OF THE INVENTION

According to the invention, an excavator base is fabricated by first erecting a substructure. Large flat plates are then laid upon the substructure and are welded together at their edges. The welded plates are then cut to define a perimeter of a floor plate. Vertical interior diaphragms and edge plates are mounted on the floor plate in various patterns and welded to the floor plate and to each other. A second series of large plates are assembled and welded together at their edges to form a top plate which is welded to the interior diaphragms and edge plates. The top plate is also cut to define the outer perimeter. The completed base can be removed from the substructure.

Preferably, the base includes a base center that is prefabricated and stress relieved. The base center is mounted on and welded to the floor plate before the diaphragm and edge plates are assembled. The top plate may be assembled, welded, and cut in place on the assembled diaphragms and edge plates. Alternately, the top plate may be assembled, welded, and cut directly on the superstructure, and then removed and set aside for later attachment.

A system of brackets and wedges may be used to level adjacent flat plates for welding.

A building structure or a tent can be erected over the foundation. Modern welding, cutting, and inspection equipment can be used at the site.

The substructure may be mounted on upright structural shapes that are mounted in the foundation. The substructure can also be supported on upright jacks.

The method allows the use of the largest flat plates that can be shipped to the fabrication site. The method also allows for the use of repetitive sizes and shapes for the top plates, bottom plates, and interior diaphragms. Both factors contribute to reducing labor and material requirements in addition to the transportation costs that are saved compared to factory-built bases.

An excavator base fabricated using the method of the invention has flatness comparable to a base assembled from factory built sections or segments.

The foregoing and other objects and advantages of the invention will appear in the detailed description which follows. In the description, reference is made to the accompanying drawings which illustrate a preferred embodiment of the invention.

DETAILED DESCRIPTION OF THE PREFERRED EMBODIMENT

Figure 1:
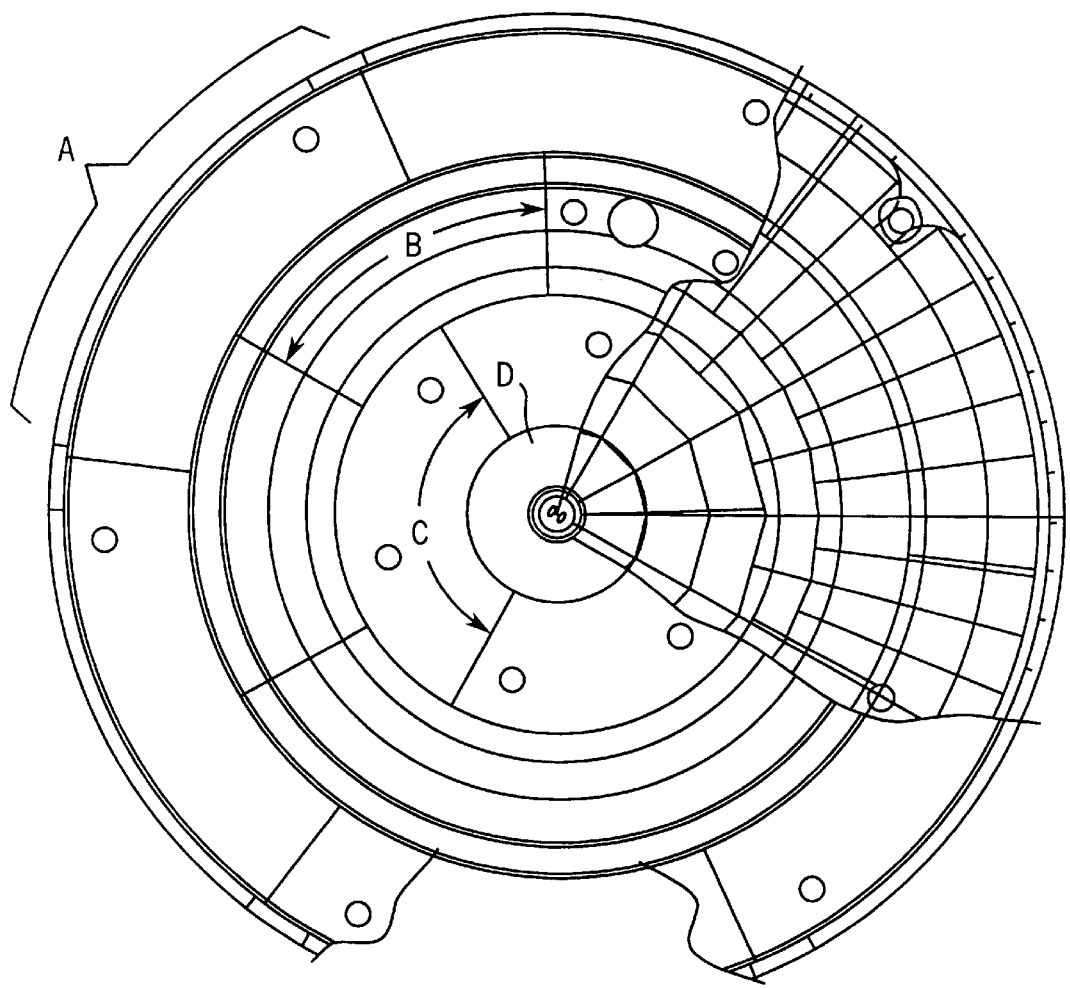
FIG. 1 is a top plan view, with portions broken away for illustration, of a factory-built excavator base.
Figure 2:
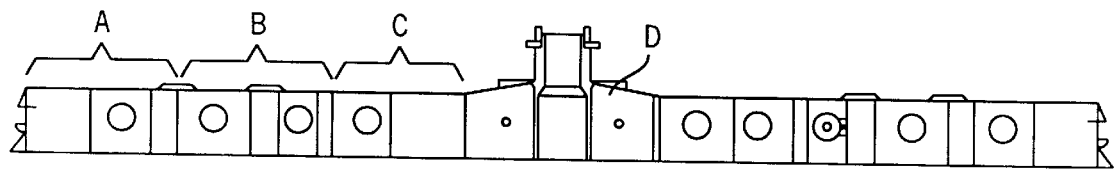
FIG. 2 is a view in vertical section taken in the plane of the line 2—2 of FIG. 1.
Figure 3:
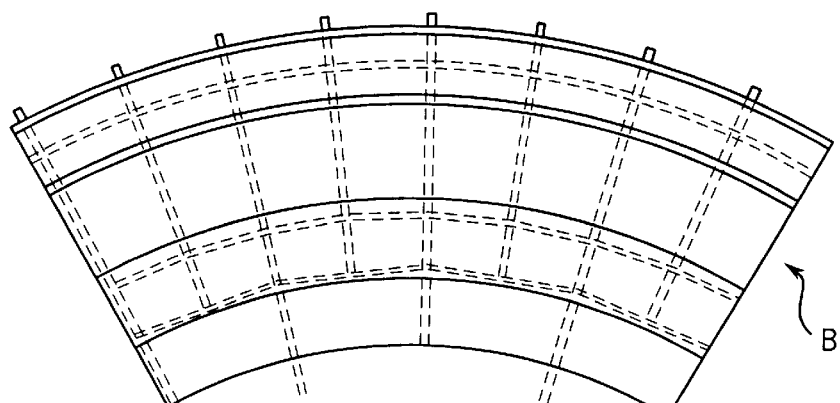
FIG. 3 is a top plan view of a segment of the base of FIG. 1.
Figure 4:
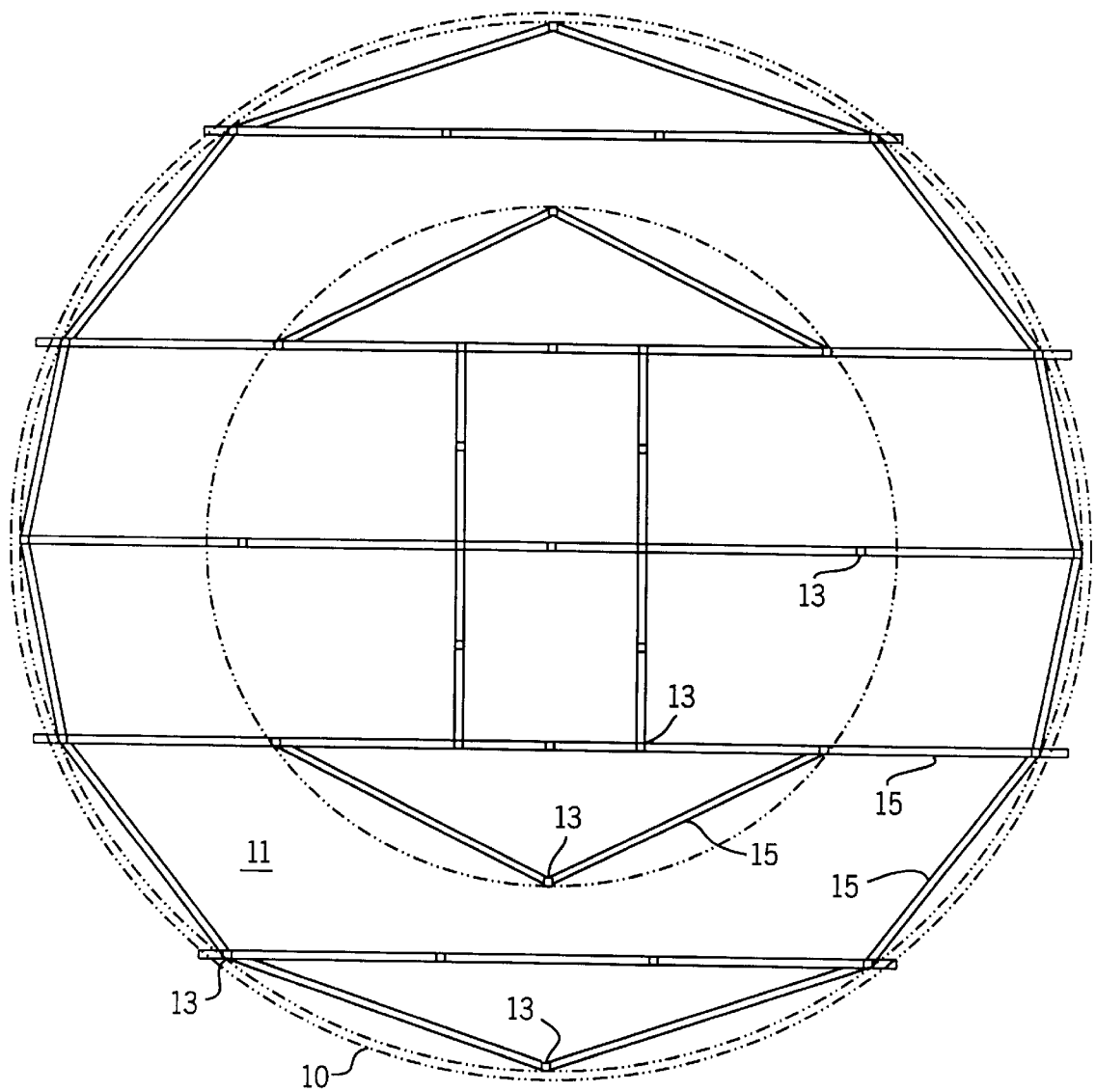
FIG. 4 is a top plan view of a foundation and substructure for practicing the present invention.
Figure 5:
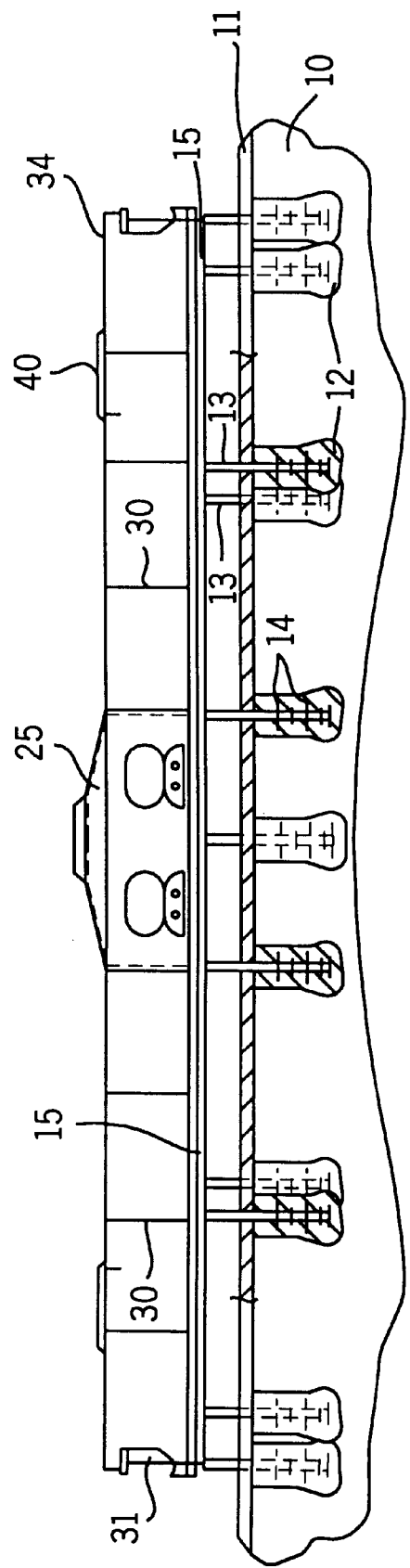
FIG. 5 is a side view partially in section of the foundation and substructure with a completed base resting thereon.

The method begins with the construction of a concrete foundation 10 having a floor 11 and a plurality of footings 12 each of which receive a structural shape to form an upright post 13. See FIGS. 4 and 5. The posts 13 are anchored in the footings 12 by an arrangement of rebars 14 that pass laterally through or are otherwise connected to the posts 13. As shown in FIG. 4, the posts 13 are arranged in an outer circle around the foundation 10 and additional posts 13 are mounted within the circle. The posts support lengths of structural beams 15 which are inscribed by the outer circle and which criss-cross the outer circle. The beams 15 define a substructure.

Figure 6:
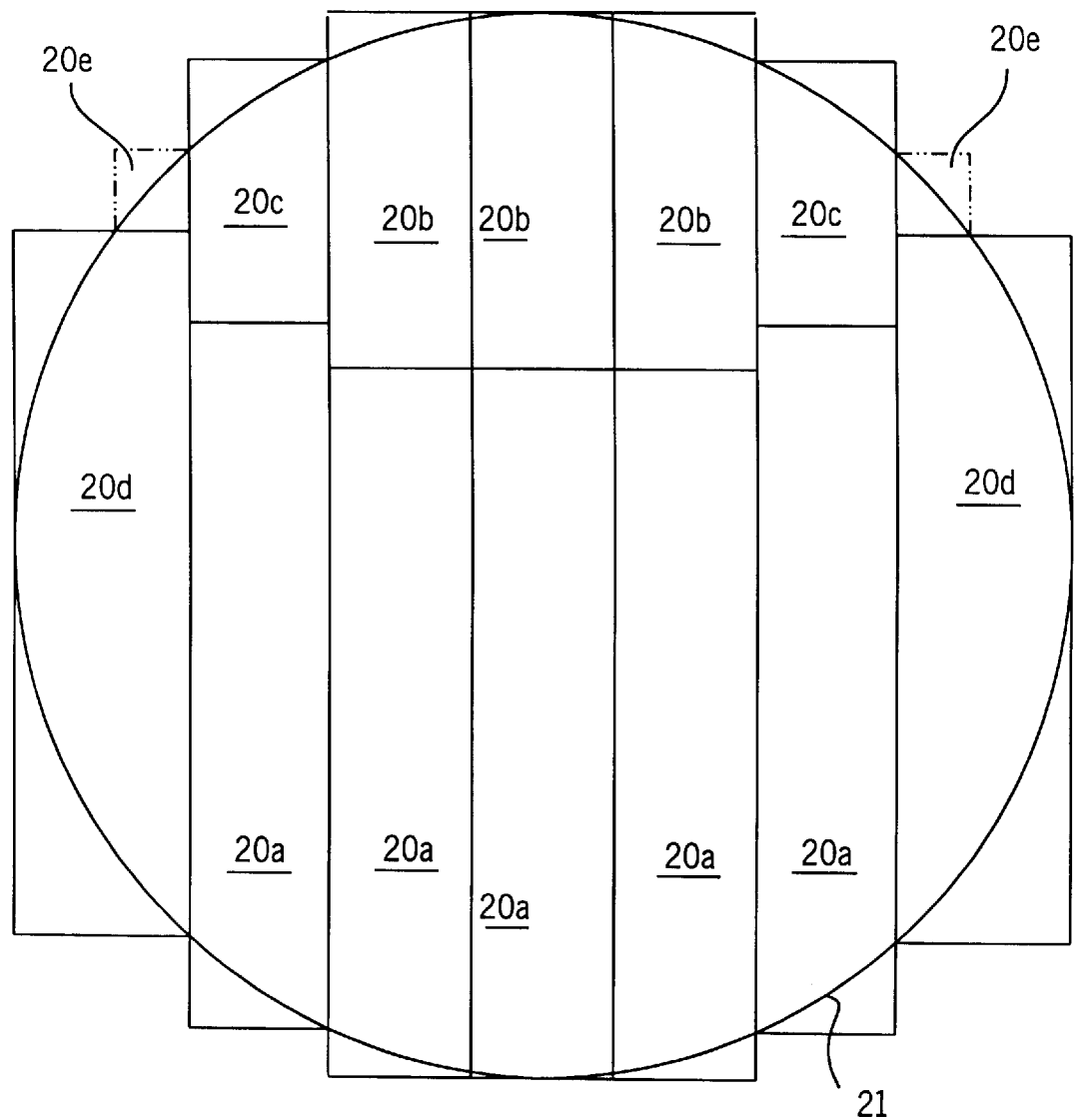
FIG. 6 is a top plan view of the flat plates which form the floor plate of the base.

As shown in FIG. 6, a series of flat steel plates 20a, 20b, 20c et seq are laid over the substructure of beams 15. The plates 20 are laid side-to-side and end-to-end to completely cover the area of a circle 21 that defines the perimeter of the base. The plates are of various sizes. They are selected to maximize the use of standard widths and lengths of flat plate that can be shipped on flat-bed trailers. The abutting edges of the plates 20 are welded to each other, and the perimeter circle 21 is cut from the welded plates. The floor plate of the base has now been completed.

Larger thickness plates can be used adjacent the perimeter of the floor plate thereby eliminating the need for wear plates at the outer perimeter.

A base center assembly 25 is next installed and welded in place. The base center 25 may be built off-site so that it can be stress relieved and then transported to the site.

Figure 7:
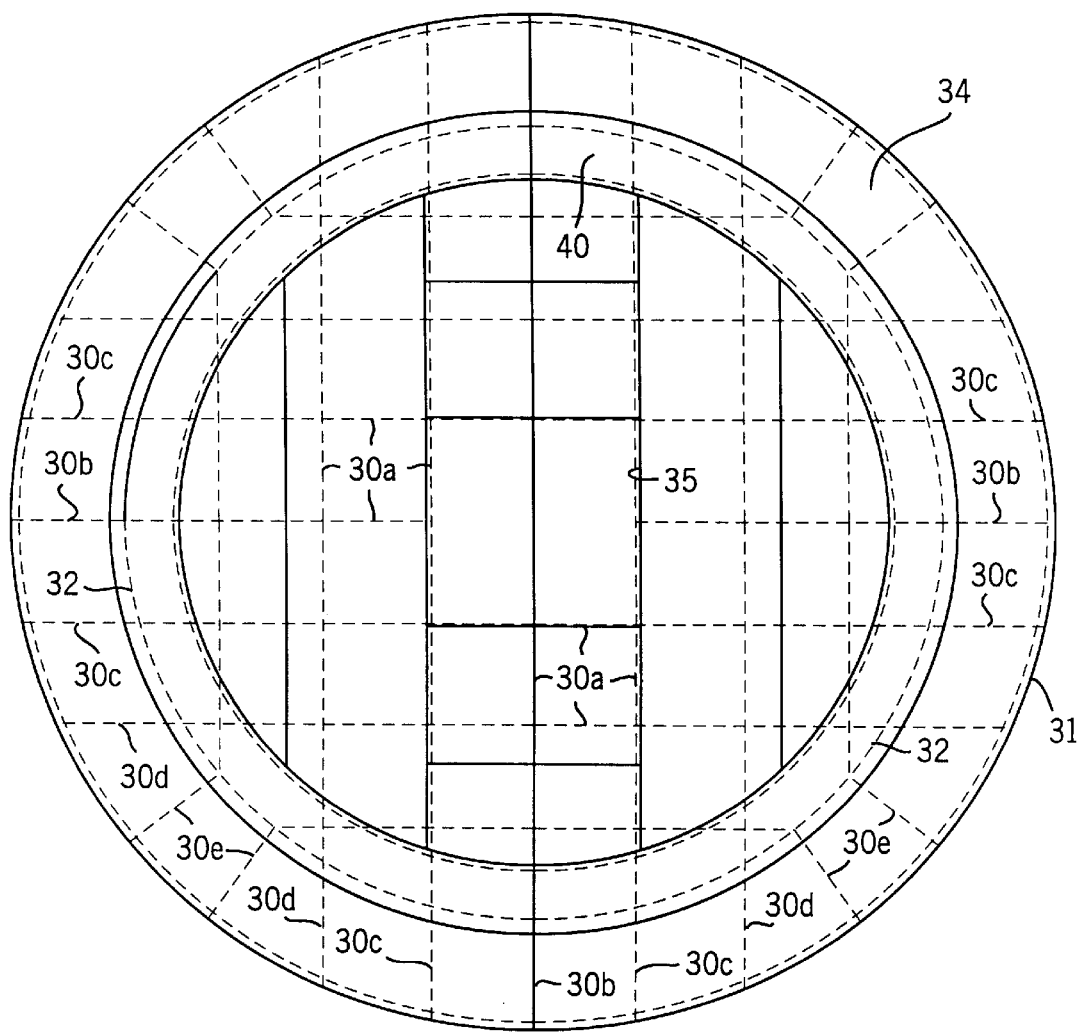
FIG. 7 is a top plan view of the base showing the interior diaphragms, the edge plates, and the top plate.

Interior diaphragms 30a, 30b, 30c, et sec are then mounted on and welded to the floor plate and to each other. Curved rolled edge plates 31 and curved interior diaphragms 32 are also mounted on and welded to the floor plate and to the interior diaphragms 30. A large duplication of standard sizes and shapes of the diaphragms is possible, as shown in FIG. 7. The diaphragms 30, 32 and edge plates 31 can be fabricated off-site and trucked to the site for assembly.

The floor plate can be used as a large drawing with the locations of the base center 25 and diaphragms 30, 32 and edge plates 31 indicated by layout lines. Preferably, the edge plates 31 are all assembled on the floor plate before welding to the floor plate and to each other.

A series of large flat plates are laid across and around the base center 25. The plates are welded to the tops of the edge plates 31 and diaphragms 30, 32 and are welded to each other to form a top plate 34 in the same manner as the floor plate is formed. The top plate 34 may be completed by cutting an outer perimeter.

Figure 8:
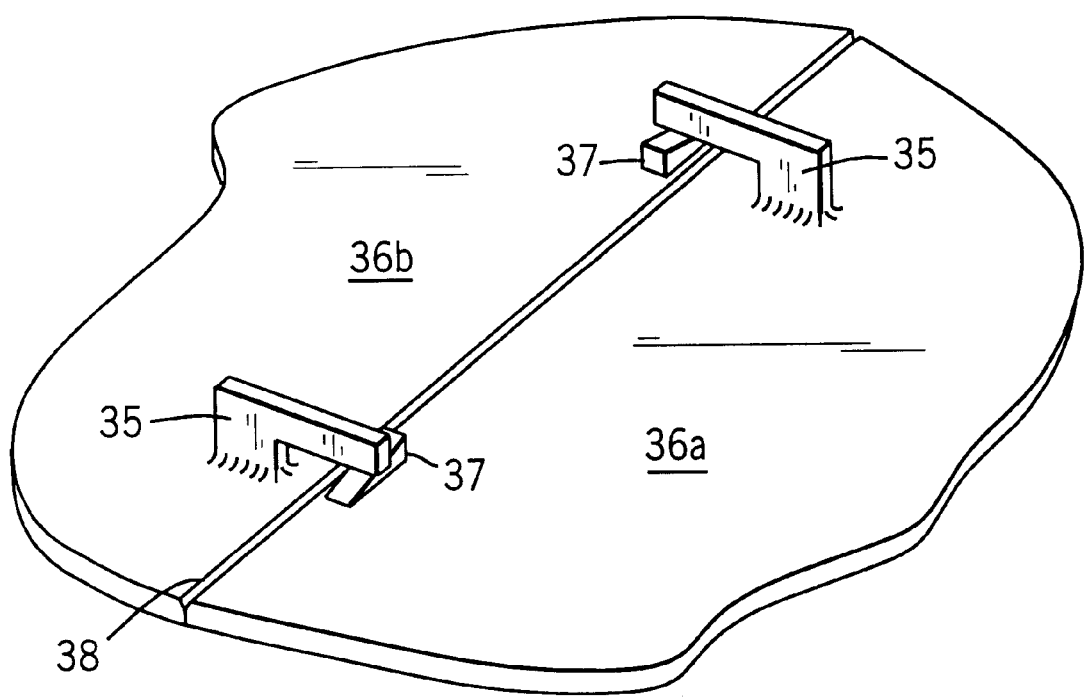
FIG. 8 is a partial view in perspective illustrating the manner in which adjacent edges of flat plates are aligned for welding.

It is very important that adjacent edges of the flat plates be aligned in the same plane before welding to ensure a flat weldment. To accomplish this, a series of brackets 35 are tack welded to adjacent plates 36a and 36b, as shown in FIG. 8. The brackets 35 project over an adjacent flat plate 36 and receive wedges 37 that are driven in until the adjacent plates 36 lie in the same plate. The wedges 37 are then tack welded into place and the edge space 38 between the plates 36 is filled with a weld. The brackets 35 and wedges 37 are removed after the welding of the edge space 38 is completed.

A ring or rings 40 formed of flat segments is welded into the top of the top plate 34 to support a roller assembly that forms a bearing and gear sections that form a rack engaged by pinions (not shown). The fabrication of the base is now complete and ready to be lifted from the substructure.

An alternative approach constructs the top plate 34 directly on the substructure as a first step. The top plate 34 is then removed and set aside until ready to be installed on top of the diaphragms 30, 32, edge plates 31, and center section 25. This approach insures a very flat top plate 34.

The substructure can be formed of concentric rings of structural beams or from a radial array of beams. The substructure can be reused.

We claim:

1. A method of fabricating an excavator base for subsequent assembly to an excavator, comprising:

erecting a substructure proximate a site at which the excavator is to be used;

assembling a series of flat plates on the substructure and welding together adjacent edges of the flat plates to form a floor plate;

cutting the perimeter of the floor plate;

assembling a series of upright internal diaphragms and edge plates on the floor plate and welding the diaphragms and edge plates to the floor plate and to each other;

attaching a top plate formed of flat plates welded together onto the diaphragms and edge plates and welding the top plate thereto so as to form an excavator base;

removing the excavator base from the substructure for attachment to an excavator; and attaching said excavator base to an excavator.

2. A method according to claim 1 together with mounting and welding a prefabricated base center assembly to the floor plate before the diaphragms and edge plates are assembled to the floor plate.

3. A method according to claim 1 together with cutting the perimeter of the top plate after the flat plates that form the top plate are assembled onto the diaphragms and edge plates and welded in place.

4. A method according to claim 1 together with temporarily attaching a bracket near the edge of a first flat plate with a portion projecting over the surface of an adjacent flat plate, driving a wedge between the bracket and the adjacent flat plate to level the adjacent flat plate with the first flat plate before welding; and removing the bracket and wedge after welding.

5. A method of fabricating an excavator base for subsequent assembly to an excavator, comprising:

erecting a substructure proximate a site at which the excavator is to be used;

assembling a series of flat plates on the substructure and welding together adjacent edges of the flat plates to form a top plate;

cutting the perimeter of the top plate;

removing the top plate from the substructure;

assembling a series of flat plates on the substructure and welding together adjacent edges of the flat plates to form a floor plate;

cutting the perimeter of the floor plate;

assembling a series of upright internal diaphragms and edge plates on the floor plate and welding the diaphragms and edge plates to the floor plate and to each other;

attaching the top plate onto the diaphragms and edge plates and welding the top plate thereto so as to form an excavator base;

removing the excavator base from the substructure for attachment to an excavator; and attaching said excavator base to an excavator.

6. A method of fabricating an excavator, comprising:

shipping excavator subassemblies for assembling into an excavator from a factory to a site at which the excavator is to be used;

shipping a series of flat plates to said site;

erecting a substructure at said site;

assembling said series of flat plates on the substructure and welding together adjacent edges of the flat plates to form a floor plate;

cutting the perimeter of the floor plate;

assembling a series of upright internal diaphragms and edge plates on the floor plate and welding the diaphragms and edge plates to the floor plate and to each other;

attaching a top plate formed of flat plates welded together onto the diaphragms and edge plates and welding the top plate thereto so as to form an excavator base; and removing the excavator base from the substructure for attachment to an excavator.

7. A method according to claim 6 together with mounting and welding a prefabricated base center assembly to the floor plate before the diaphragms and edge plates are assembled to the floor plate.

8. A method according to claim 6 together with cutting the perimeter of the top plate after the flat plates that form the top plate are assembled onto the diaphragms and edge plates and welded in place.

9. A method according to claim 6 together with temporarily attaching a bracket near the edge of a first flat plate with a portion projecting over the surface of an adjacent flat plate, driving a wedge between the bracket and the adjacent flat plate to level the adjacent flat plate with the first flat plate before welding; and removing the bracket and wedge after welding.

* * * * *